(12) United States Patent
Fujisaki

(10) Patent No.: US 8,848,907 B2
(45) Date of Patent: Sep. 30, 2014

(54) COMPUTER PROGRAM PRODUCT AND METHOD FOR PROCESSING INFORMATION TO OBTAIN AN HMAC

(71) Applicant: Kabushiki Kaisha Toshiba, Tokyo (JP)

(72) Inventor: Koichi Fujisaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/050,401

(22) Filed: Oct. 10, 2013

(65) Prior Publication Data

US 2014/0064483 A1    Mar. 6, 2014

Related U.S. Application Data

(62) Division of application No. 13/050,332, filed on Mar. 17, 2011, now Pat. No. 8,578,172.

(30) Foreign Application Priority Data

Jun. 4, 2010 (JP) ................................ 2010-128960

(51) Int. Cl.
  *H04L 9/32* (2006.01)
  *H04L 9/08* (2006.01)
(52) U.S. Cl.
  CPC ............ *H04L 9/0816* (2013.01); *H04L 9/3242* (2013.01)
  USPC .............................. 380/44; 380/246; 713/179
(58) Field of Classification Search
  CPC ............................ H04L 9/3242; H04L 9/0816
  USPC ........................................... 713/179; 380/246
  See application file for complete search history.

(56) References Cited

U.S. PATENT DOCUMENTS 7,697,682 B2 *   4/2010   Tsuruga ......................... 380/28
  2004/0199774 A1 * 10/2004  Zissimopoulos et al. ..... 713/179

(Continued)

FOREIGN PATENT DOCUMENTS

JP    2002-162904    6/2002
  JP    2006-39000     2/2006
  JP    2007-164589    6/2007

OTHER PUBLICATIONS

"The Keyed-Hash Message Authentication Code (HMAC)", Federal Information Processing Standards Publication, FIPS PUB 198, Department of Commerce, United States of America, pp. i-vii, and 1-13, (Mar. 6, 2002).

Notification of Reason(s) for Refusal issued by the Japanese Patent Office on Feb. 28, 2012, for Japanese Patent Application No. 2010-128960, and English-language translation thereof.

(Continued)

*Primary Examiner* — Haresh N Patel
(74) *Attorney, Agent, or Firm* — Finnegan, Henderson, Farabow, Garrett & Dunner, L.L.P.

(57) ABSTRACT

One embodiment is a computer program product for processing information to obtain an HMAC, comprising: by using a padding circuit, generating first key data by adding 0 with respect to secret key data, setting the secret key data as second key data, or generating third key data by adding 0 with respect to a first digest value, according to comparison result of a second key length and a block length of the hash function, and performing an exclusive OR operation with a second constant with respect to one of the first key data, the second key data, and the third key data to calculate first data; by using a hash calculation circuit, obtaining the first digest value, and obtaining a second digest value, by using a holding circuit, storing the secret key data or the first digest value; and by using a control unit, managing a processing state for calculating the HMAC.

10 Claims, 4 Drawing Sheets

(56) References Cited

U.S. PATENT DOCUMENTS

| | | | |
|---|---|---|---|
| 2006/0005031 A1* | 1/2006 | Apostolopoulos | 713/179 |
| 2006/0023877 A1* | 2/2006 | Tsuruga | 380/28 |
| 2008/0082824 A1* | 4/2008 | Ibrahim et al. | 713/171 |
| 2008/0133929 A1* | 6/2008 | Gehrmann et al. | 713/179 |
| 2008/0276095 A1* | 11/2008 | Iwamura | 713/179 |
| 2009/0141887 A1* | 6/2009 | Yap et al. | 380/28 |
| 2009/0177891 A1* | 7/2009 | Carro | 713/179 |
| 2011/0302418 A1* | 12/2011 | Fujisaki | 713/179 |

OTHER PUBLICATIONS

Sklavos et al., "Open Mobile Alliance (OMA) Security Layer: Architecture, Implementation and Performance Evaluation of the Integrity Unit," New Generation Computer (2005), 23:77-100.

Khan et al., "Design and Performance Analysis of a Unified, Reconfigurable HMAC-Hash Unit," IEEE Transactions on Circuits and Systems (Dec. 2007), 54:2683-95.

* cited by examiner

US 8,848,907 B2

COMPUTER PROGRAM PRODUCT AND METHOD FOR PROCESSING INFORMATION TO OBTAIN AN HMAC

This is a division of application Ser. No. 13/050,332, now U.S. Pat. No. 8,578,172, filed Mar. 17, 2011, which is incorporated herein by reference.

CROSS-REFERENCE TO RELATED APPLICATION

The application is based upon and claims the benefit of priority from Japanese Patent Application No. 2010-128960 filed on Jun. 4, 2010; the entire contents of which are incorporated herein by reference.

FIELD

One embodiment generally relates to an information processing devices detecting improper manipulation.

BACKGROUND

When transmitting and receiving data through the Internet, the message authentication code (MAC) is used to check that the data has not been tampered.

One of the algorithms of the message authentication code includes a keyed-hashing for message authentication code (HMAC) (NIST, FIPS PUB 198. FEDERAL INFORMATION PROCESSING STANDARDS PUBLICATION. "The keyed-Hash Message Authentication Code (HMAC)").

The example of a circuit architecture for generating the HMAC is disclosed as a prior art.

When the sending terminal transmits the secret key, the message data, and the HMAC through the Internet and the receiving terminal receives the secret key, the message data and the HMAC generated by the sending terminal, the receiving terminal can carry out the calculation of the HMAC using the secret key and the message data.

If the HMAC which is received on the receiving terminal and a result of HMAC calculation using a received message and a key data are different, the received message data may be interpolated in a communication path, the message data may not be correctly received, or the sender of the message data may not be the sender terminal which is not intended for the receiving terminal.

In any case, the received message data is non-reliable data.

On the other hand, the received HMAC and the calculation of using the received message and the key data is same, the received message data is confirmed as the message data sent from the person who is intended for receiving terminal. So the message can be sent and received safety over the Internet using a HMAC.

FIG. 1 shows a flowchart of the procedure of the HMAC shown in non-patent document 1. The procedure of the HMAC shown in non-patent document 1 will be described below using FIG. 1. The key data K0 is generated from the received secret key K in one of the steps of step S1 to step S3. The size (Length (K)) of the secret key K and the block length (Length(s)) of the hash function are compared in step S0.

In step S1, the secret key K is set as the key data K0 if the size (Length (K)) of the secret key K and the block length (Length (B)) of the hash function are equal, and go to step S4.

In step S2, if the size (Length (K)) of the secret key K is longer than the block length (Length (B)) of the hash function, the secret key K is calculated with the hash function H to obtain the digest (H(K)) of the secret key, and 0 is added with respect to the obtained result H(K) until the block length of the hash function is reached to generate the key data K0. After the K0 is generated, the process proceeds to step S4. If the block length (Length (B)) of the hash function is longer than the size (Length (K)) of the secret key K (Length (B)>Length (K)), the go to step S3.

In step S3, Length (B)>Length (K), append zeros to the end of K to create a B-byte string K0. After the K0 is generated, the process proceeds to step 4.

In step S4, exclusive-or K0 with an ipad which is constant data (K0 xor ipad).

In step S5, append the received message data 'text' to the string resulting from step 4 (K0 xor ipad||text).

In step S6, the data (K0 xor ipad||text) generated in step S5 is calculated with the hash function H to obtain the digest H (K0 xor ipad||text) thereof.

In step S7, exclusive-or K0 with an opad which is constant data (K0 xor opad).

In step S8, append the result from step 6 to step 7.

In step S9, calculate the digest H((K0 xor opad)||H(K0 xor ipad||text)) of the data (K0 xor opad)||H(K0 xor ipad||text) generated in step S8 is created.

In step S10, the value of t bytes from the left side of the data H((K0 xor opad)||H(K0 xor ipad||text)) obtained in step S9 is obtained, which value becomes HMAC.

If the receiving terminal receives a plurality of message data, the HMAC is obtained according to the procedure of S1 to S10 for every message data. In such a case, if the HMAC circuit does not calculate simultaneously the HMAC of the plurality of message data, the operation of the HMAC on the message data is not executed until operation the HMAC for one certain message data is finished.

As previously described, the receiving terminal performs the calculation of the HMAC using the secret key and the message data, and cannot complete the calculation of the HMAC unless whole message data and the secret key are received. The sending terminal may transmit one secret key in a plurality of packets or may transmit one message data in a plurality of packets.

The arrival of the packet of one part of the secret key or the packet of one part of the message data may take time depending on the network traffic, where the HMAC circuit may be waiting for the next packet and the calculation of the HMAC of the different message data that has already arrived may be waiting, which lowers the calculation efficiency.

One aspect of the present invention focuses on such point, and provides an information processing device capable of efficiently calculating the HMAC for each of the plurality of message data.

DETAILED DESCRIPTION

According to one embodiment, there is provided an information processing device for obtaining an HMAC (keyed- Hashing for message authentication code), including a padding circuit to generate first key data in which a first constant is added with respect to secret key data when a secret key length of the input secret key data is shorter than a block length of a hash function, to set the secret key data as second key data when the secret key length is equal to the block length, to generate third key data in which the first constant is added with respect to a first digest value or a digest value of the secret key data when the secret key length is longer than the block length, and to calculate first data by performing an exclusive OR with a second constant with respect to one of the first key data, the second key data, or the third key data; a hash calculation circuit to obtain the first digest value and to obtain a second digest value or a digest value of third data in which the first data and input message data are added; and a control unit configured to manage the processing state for calculating the HMAC, wherein the hash calculation circuit outputs a first midway progress value which is the midway progress of the first digest value calculated before the interruption to the outside when interrupting the calculation process of the first digest value in the middle, and resumes the calculation process of the first digest value using the first midway progress value when a signal indicating the instruction to resume the calculation process of the first digest value is input to the control unit.

Figure 1:
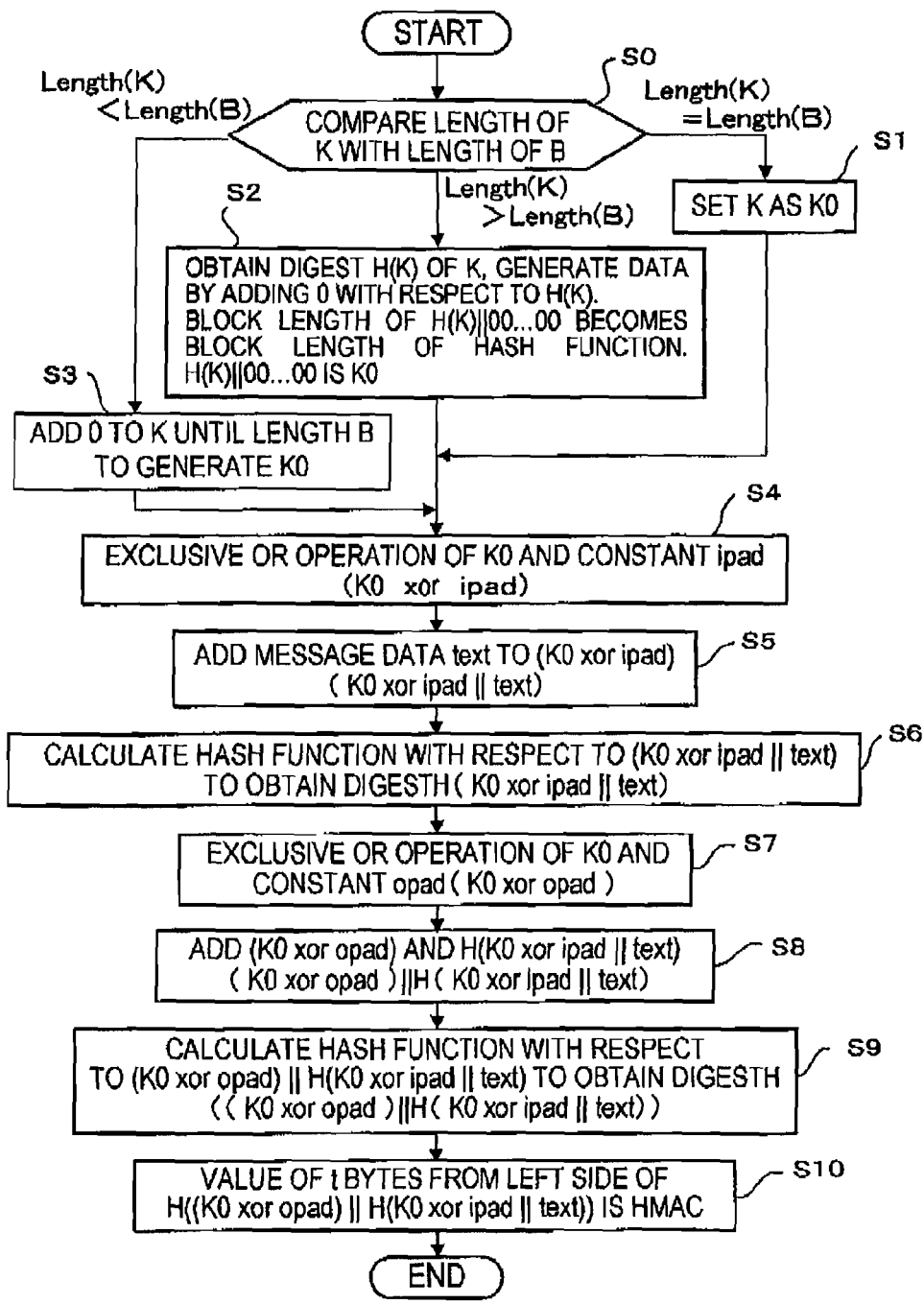
FIG. 1 is a view showing a flowchart showing the procedure of the HMAC of a related art defined in FIPS PUB 198.
Figure 2:
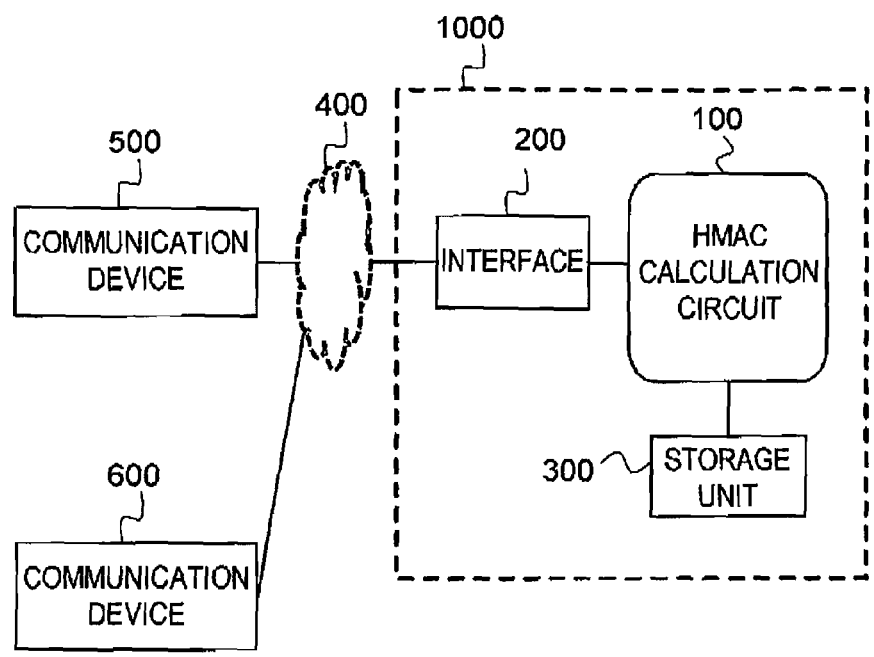
FIG. 2 is a block diagram showing a configuration of a communication system according to one embodiment of the present invention.

One embodiment will be hereinafter described. FIG. 2 is a block diagram showing the configuration of a communication system according to the embodiment.

In the communication system, a communication device 1000 is added to a plurality of communication devices 500, 600 with a network 400. The communication device 1000 is configured to include an HMAC calculation circuit 100, an interface 200, and a storage unit 300.

The interface 200 of the communication device 1000 receives the secret key and the data length of the secret key, the message data and the data length of the message data, and the HMAC corresponding to the message data from the communication device 500 and the communication device 600 through the network.

The HMAC calculation circuit 100 calculates the HMAC from the received secret key and the message data, compares the received HMAC and the calculated HMAC, and determines that the message data is reliable if the HMAC match and determines that the message data is not reliable if the MAC differ.

Figure 3:
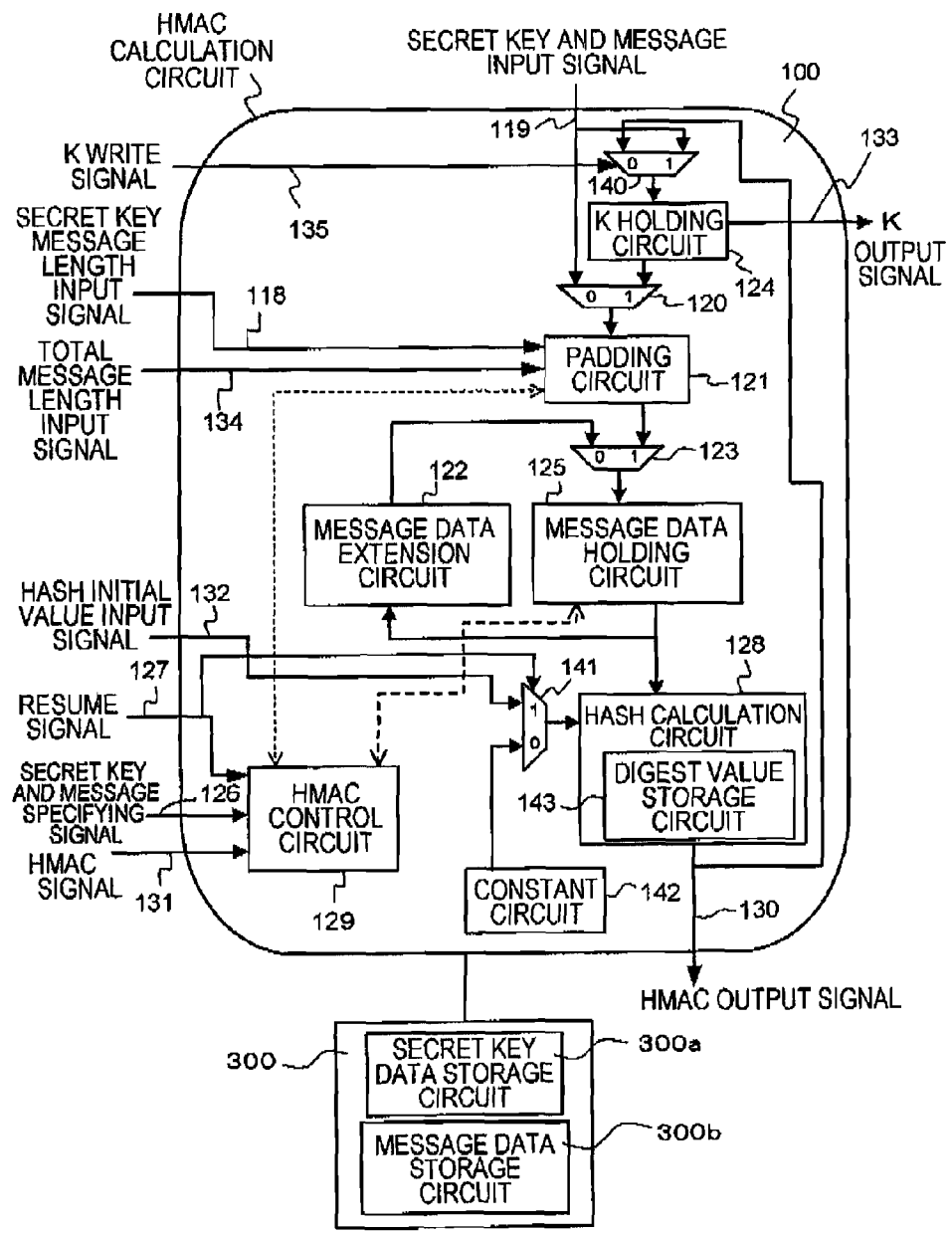
FIG. 3 is a block diagram showing a architecture of an HMAC calculation circuit 100 according to the embodiment.
Figure 4:
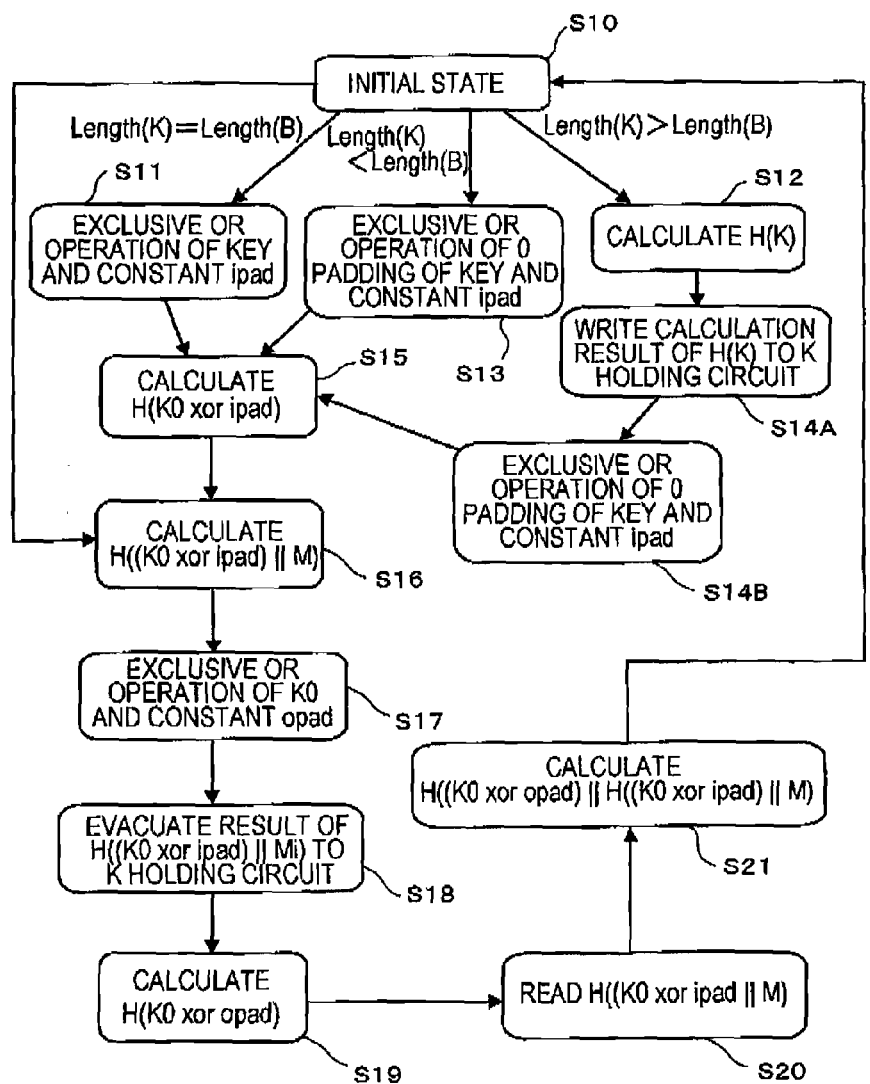
FIG. 4 is a state transition graph of a state machine showing the state of the HMAC calculation circuit 100 according to the embodiment.

The configuration example of the HMAC calculation circuit 100 according to the embodiment is shown in FIG. 3. FIG. 4 shows a state transition graph of the HMAC calculation circuit 100. The state transition of the HMAC calculation circuit is managed by an HMAC control circuit 129.

Although described in detail later, two cases in which the process cannot proceed can be assumed when obtaining data through the network in the calculation of the HMAC shown in FIG. 4. The first case is when the secret key K is longer than the block length B of the hash function and the reception of the data of the secret key K takes time in step S12, and the other case is when the message data is longer than the block length B of the hash function and the reception of the message data takes time in step S18. To solve them, the HMAC calculation circuit 100 of one example shown in FIG. 3 includes a secret key/message data specifying signal line 126 and a resume signal line 127.

The configuration of the HMAC calculation circuit 100 of FIG. 3 will be described below.

The HMAC calculation circuit 100 includes a selector 120, a padding circuit 121, a message data extension circuit 122, a selector 123, a K holding circuit 124, a message data holding circuit 125, a hash calculation circuit 128, an HMAC control circuit 129, a selector 140, a selector 141, and a constant circuit 142.

The selector 120 outputs the signal input by the secret key and message input signal line 119 to the padding circuit 121 when the externally input control signal (not shown) is "0", and outputs the data input from the K holding circuit 124 to the padding circuit 121 when the externally input control signal is "1".

The padding circuit 121 I a circuit for adding (padding) 0 with respect to the secret key data K when the secret key length (Length (K)) of the input secret key data K is shorter than the block length (Length (B)) of the hash function to generate key data K0 in which the data length is equal to the block length (Length (B)) of the hash function. The padding circuit 121 is also a circuit for adding (padding) 0 with respect to a digest value H(K) (digest value H(K) will be described later) of the secret key K to generate the key data K0 in which the data length is equal to the block length (Length (B)) of the hash function. The padding circuit 121 is also a circuit for adding (padding) 0 with respect to a divided secret key ($K_n$) when the secret key data K is divided into n data (hereinafter referred to as divided secret key) ($K_0, K_1, K_2, \ldots, K_n$) and the data length of the divided secret key (Kn) or the $n^{th}$ data is shorter than the block length (Length (B)) of the hash function.

The padding circuit 121 is also a circuit for adding (padding) 0 with respect to the message data M until the data length becomes (Length (B)) when the data length Length (M) of the message data is shorter than the block length (Length (B)) of the hash function.

Furthermore, the padding circuit 121 is a circuit for adding (padding) 0 with respect to the message data block $M_n$ until the data length becomes Length (B) when the message data M is divided into n message data blocks $M_0, M_1, M_2, \ldots, M_n$ and the data length of the message data block $M_n$ or the nth data is shorter than the Length (B).

The padding circuit 121 is also a circuit for adding (padding) 0 with respect to H(K0 xor ipad)||M)(H(K0 xor ipad)||M), to be described later, until the data length becomes Length (B). The padding circuit is also a circuit for performing exclusive OR operation with the constant ipad defined in the specification with respect to the key data (K0) to generate (K0 xor ipad). It is also a circuit for performing exclusive OR operation with the constant opad defined in the specification with respect to the key data (K0) to generate (K0 xor opad).

The key data K0 is the secret key data K when the secret key length (Length (K)) of the secret key data K is equal, to the block length (Length (B)) of the hash function, the key data K0 is the data in which 0 is added (padded) with respect to the secret key data K when the secret key length (Length (K)) of the secret key data K is shorter than the block length (Length (B)) of the hash function, and the key data K0 is the data in which 0 is added (padded) with respect to the digestive value H(K) of the secret key K when the secret key length (Length (K)) of the secret key data X is longer than the block length (Length (B)) of the hash function.

Upon receiving the data held in the message data holding circuit 125, the message data extension circuit 122 outputs the result of performing extended arithmetic of the message data again to the message data holding circuit 125 through the selector 123. The extended arithmetic is the calculation on the input message data defined in the hash algorithm, where the specific calculation is determined according to every hash algorithm.

The selector 123 outputs the data input from the padding circuit 121 to the message data holding circuit 125 when the control signal (not shown) input from the HMAC control circuit 129 is "1", and outputs the data input from the message data extension circuit 122 to the message data holding circuit 125 when the control signal input from the HMAC control circuit 129 is "0".

The K holding circuit 124 is a circuit for holding the secret key data K, and the digest value H(K) of the secret key data K written thereto. The K holding circuit 124 is also a circuit to which H((K0 xor ipad)||M) is once written from the hash calculation circuit 128 to be temporarily evacuated from the hash calculation circuit 128.

When the calculation of different secret key data K and different message data M can be executed first while obtaining the digest HUM xor ipad)||M) for certain secret key data and certain message data, the K holding circuit 124 outputs the held secret key data K or H(K) to the secret key data storage circuit 300a of the storage unit 300 using the K output signal line 133.

The K or H(K) evacuated to the secret key data storage circuit 300a of the storage unit 300 is again input by the secret key and message input signal line 119, and again input to the K holding circuit 124 by inputting a signal, in which the K write signal is 1, to the selector 140 using a K write signal line 135.

The message data holding circuit 125 is a circuit for holding the (K0 xor ipad), (K0 xor opad) written by the padding circuit 121. The message data holding circuit 125 is also a circuit for holding the divided secret key $K_i$ (i=0, ..., n) written thereto. It is also a circuit for holding the data in which 0 is added to the divided secret key ($K_n$). Furthermore, it is a circuit for holding the data in which 0 is added to the message data M written thereto.

It is also a circuit for holding the data in which 0 is added to H(K0 xor ipad)||M) written thereto. The message data holding circuit 125 is also a circuit for receiving the calculation result of the message data extension calculation circuit 122 via the selector 123 and holding the same.

The hash calculation circuit 128 obtains the digest (H(K)) of the secret key K when the secret key length (Length (K)) is longer than the block length (Length (B)) of the hash function. In this case, the secret key K is divided into n data (referred to as divided secret key) ($K_0, K_1, K_2, \ldots, K_n$) and input to the hash calculation circuit 128 in the order of $K_0, K_1, K_2, \ldots, K_{n-1}, K_n$ (or data in which 0 is added to $K_n$), and the hash calculation is repeatedly carried out. The digest value H(K) (=H($K_0, K_1, K_2, \ldots, K_n$) of the secret key K can be obtained as a result. The data length of $K_0, K_1, K_2, \ldots, K_{n-1}$ is equal to the block length of the hash function. The data length of $K_n$ is smaller than or equal to the block length of the hash function.

If the data up to $K_i$ of the divided secret key ($K_0, K_1, K_2, \ldots, K_n$) has arrived but all the data of a different secret key K (assumed as K2) is obtained before the next data $K_{i+1}$ for obtaining H(K) arrives when obtaining the digest H(K) of the secret key K, the hash calculation circuit 128 outputs an intermediate result (H($K_0, K_1, K_2, \ldots, K_i$) of H(K) by the HMAC output signal line 130, and records the same in the secret key data storage circuit 300a of the storage device 300. The intermediate result H($K_0, K_1, K_2, \ldots, K_i$) of the secret key K recorded in the storage device 300 is returned to the hash calculation circuit 128 when resuming from the middle of the calculation of the digest of the secret key K. Therefore, if H($K_0, K_1, K_2, \ldots, K_i$) is input to the hash initial value input signal line 132 and the resume signal to be transmitted through the resume signal line 127 is input as 1 to the selector 141, the intermediate result H($K_0, K_1, K_2, \ldots, K_i$) is written to the digest value storage circuit 143 in the hash calculation circuit 128.

The hash calculation circuit 128 performs the hash calculation on the K0 xor ipad written to the message data holding circuit 125 to obtain the digest H(K0 xor ipad). The hash calculation circuit 128 also performs the hash calculation on the K0 xor opad written to the message data holding circuit 125 to obtain the digest H(K0 xor opad).

The hash calculation circuit 128 obtains the intermediate value H((K0 xor ipad)||M) of the HMAC. If the data length (Length (M)) of the message data is longer than the block length (Length (B)) of the hash function, the message data M is divided into n message data blocks ($M_0, M_1, M_2, \ldots, M_n$) and input to the hash calculation circuit 128 in the order of $M_0, M_1, M_2, \ldots, M_n$ (or data in which 0 is added to $M_n$), and the hash calculation is repeatedly carried out. Then, H((K0 xor ipad)||$M_0, M_1, M_2, \ldots, M_n$%) (=H((K0 xor ipad)||M)) can be obtained as a result.

If the data up to $M_i$ has arrived of the divided n message blocks ($M_0, M_1, M_2, \ldots, M_n$) of the message data M but all the data of a different message data M (assumed as M2) and the secret key K (assumed as K2) is obtained before the next data $M_{i+1}$ for obtaining H((K0 xor ipad)||$M_0, M_1, M_2, \ldots, M_n$) arrives when obtaining H((K0 xor ipad)||M). the hash calculation circuit 128 outputs an intermediate result H((K0 xor ipad)||$M_0, M_1, M_2, \ldots, M_i$) of H((K0 xor ipad)||M) by the HMAC output signal line 130, and records the same in the message data storage circuit 300b of the storage device 300.

When resuming the calculation from the middle of the calculation of H((K0 xor ipad)||M), H((K0 xor ipad)||$M_0, M_1, M_2, \ldots, M_i$)) recorded in the message data storage circuit 300b of the storage device 300 is returned to the hash calculation circuit 128 in the interruption resuming step. To this end, if H((K0 xor ipad)||$M_0, M_1, M_2, \ldots, M_i$)) is input to the hash initial value input signal line 132 and the resume signal to be transmitted through the resume signal line 127 is input as 1 to the selector 141, H((K0 xor ipad)||$M_0, M_1, M_2, \ldots, M_i$)) is written to the digest value storage circuit 143 in the hash calculation circuit 128.

The state machine of the HMAC control circuit 129 manages the state transition of the HMAC calculation circuit 100. The state machine in the HMAC control circuit 129 can control the state by the HMAC signal line 131, the resume signal line 127, and the secret key and message specifying signal line 126 from outside the HMAC calculation circuit 100.

For instance, the state machine in the HMAC control circuit 129 can be transitioned to the initial state by inputting a signal in which the HMAC signal is set to 0 for one or more clock cycles to the HMAC control circuit 129.

Assuming the resume signal is 1 and the secret key and message specifying signal is 0, the state of the state machine in the HMAC control circuit 129 can be transitioned to the state of resuming the calculation of the digest of the secret key. Furthermore, the state machine in the HMAC control circuit 129 transitions to the state of resuming the calculation of H((K0 xor ipad)||M) by setting the resume signal to 1 and the secret key and message specifying signal to 1.

The selector 140 outputs the data K or H(K) evacuated in the secret key data storage circuit 300a of the storage unit 300 to the K holding circuit 124 through the secret key and message input signal line 119 when the K write signal input from the K write signal line 135 is "1", and outputs the output of the hash calculation circuit 128 to the K holding circuit 124 when the K write signal input from the K write signal line 135 is "0".

The selector 141 outputs the signal input from the hash initial value input signal line 132 to the hash calculation circuit 143 when the resume signal input from the resume signal line 127 is "1", and outputs the signal input from the constant circuit 142, to be described later, to the hash calculation circuit 128 when the resume signal is "0". For instance, the intermediate result $H(K_0, K_1, K_2, \ldots, K_i)$ of $H(K)$ is output to the hash calculation circuit 128 by inputting $H(K_0, K_1, K_2, \ldots, K_i)$ to the hash initial value input signal line 132 and setting the resume signal to 1. Furthermore, the intermediate result $H((K0 \text{ xor } ipad)\|M_0, M_1, M_2, \ldots, M_i))$ of $H((K0 \text{ xor } ipad)\|M)$ is output to the hash calculation circuit 128 by inputting $H((K0 \text{ xor } ipad)\|M_0, M_1, M_2, \ldots, M_i))$ to the hash initial value input signal line 132 and setting the resume signal as 1.

The constant circuit 142 outputs an initial value defined in the hash algorithm. When the resume signal "0" is input to the selector 141, the output of the constant circuit 142 is input from the selector 141 to the hash calculation circuit 128 through the selector 141. The initial value is a value used as the initial value of the hash calculation when the hash calculation circuit 128 obtains a digest with respect to certain data.

The process of the HMAC calculation circuit 100 shown in FIG. 3 will now be described according to the state transition graph shown in FIG. 4. The state transition of the HMAC control circuit 129 will also be described.

First, the HMAC signal set to 0 is input to the HMAC control circuit 129 by the HMAC signal line 131. When the HMAC signal set to 0 is input, the state of the HMAC calculation circuit managed by the HMAC control circuit 129 becomes an initial state (S10). The state of the HMAC calculation circuit 100 becomes an initial state by the HMAC control circuit 131.

The HMAC signal set to 1 is then input to the HMAC control circuit 129 by the HMAC signal line 131. The HMAC control circuit 129 starts the operation when the HMAC signal set to 1 is input.

The data length (secret key length) (Length (K)) of the secret key to be used to calculate the HMAC is input to the padding circuit 121 by the secret key and message input signal line 118. The padding circuit 121 determines which process of step S11, step S12, step S13 of FIG. 4 to perform by the input Length (K).

The processes of steps S11, S12, or S13, S14A, S14B are performed by the value of the secret key length (Length (K)). In such processes, the K0 having the length equal to the block length (Length (B)) of the hash function is generated using the data of the secret key K and the exclusive OR operation with the constant ipad is performed on the generated K0. For instance, if Length (K)<Length (B), the padding process, that is, the process of adding 0 to the value of K until the length of B is obtained (adding process) is performed since the secret key length is shorter than the block length of the hash function. If Length (K)>Length (B), the hash value H(K) of the secret key is obtained and the padding process is performed on H(K) to have K0 since the secret key length is longer than the block length. The K becomes K0 if Length (K) and Length (B) are equal.

The exclusive OR operation with the constant ipad is performed on the K0 having the same length as the block length obtained in the above manner. The specific processes will be described below.

<(1) If Length (K)=Length (B); S11>

If the secret key length (Length (K)) is equal to the block length (Length (B)) of the hash function, the padding circuit 121 determines to perform the process of step S11. The state of the HMAC control circuit 129 also transitions to step S11.

The padding circuit 121 performs the exclusive OR operation with the constant ipad defined in the specification with respect to K0 with the secret key data K input through the secret key and message input signal line 119 as the key data K0. The calculation result thereof is written to the message data holding circuit 125. At the same time, the input K is written to the K holding circuit 124. The secret key data does not need to be input again at the time of the calculation in step S17 of FIG. 4 by writing the K in the K holding circuit 124.

After the exclusive OR operation of the K and the ipad is completed, the padding circuit 121 notifies the HMAC control circuit 129 that the exclusive OR operation of the K and the ipad is completed. The state of the HMAC control circuit 129 transitions to S15.

<(2) If Length (K)<Length (B); S13)>

If the secret key length (Length (K)) is shorter than the block length (Length (B)) of the hash function, the padding circuit 121 determines to perform the process of step S13. The state of the HMAC control circuit 129 also transitions to S13. The padding circuit 121 adds (pads) 0 to the input K until equal to the block length (Length (B)) to generate the key data K0. Therefore, the number of 0 the padding circuit 121 pads can be obtained by the difference between the block length (Length (B)) of the hash function and the Length (K) input to the padding circuit.

The padding circuit 121 writes the input K to the K holding circuit 124. The padding circuit 121 performs the exclusive OR operation with the constant ipad defined in the specification with respect to the key data K0 and writes the calculation result thereof (K0 xor ipad) to the message data holding circuit 125. After the exclusive OR operation of the K0 and the ipad is completed, the padding circuit 121 notifies the HMAC control circuit 129 that the exclusive OR operation of the K0 and the ipad is completed. The state of the HMAC control circuit 129 transitions to S15.

<(3) If Length (K)>Length (B); S12)>

If the secret key length (Length (K)) is longer than the block length (Length (B)) of the hash function, the padding circuit 121 determines to perform the process of step S12. The state of the HMAC control circuit 129 also transitions to S12.

As in this case, if Length (K) is longer than Length (B), the hash value (digest value) (H(K)) of the secret key K is obtained. In order to obtain H(K)), the secret key K is divided into n data (referred to as divided secret key) $(K_0, K_1, K_2, \ldots, K_n)$ and input to the hash calculation circuit 128 in the order of $K_0, K_1, K_2, \ldots, K_n$, and the hash calculation is repeatedly carried out. Assume here that the data length of $K_0$, $K_1, K_2, \ldots, K_{n-1}$ is equal to the block length of the hash function, and the data length of $K_n$ is smaller than or equal to the block length of the hash function.

First, the divided secret key $K_i$ (i=0, ..., n) is input to the HMAC calculation circuit 100 through the secret key and message input signal line 119 in order from $K_0$. The input $K_i$ is passed through the padding circuit 121, written to the message data holding circuit 125, and input to the hash calculation circuit 128. After the input of $K_i$ is finished, the hash calculation using the hash calculation circuit 128 is automatically performed. As a result, the digest value output from the hash calculation circuit 128 at the time point the input up to $K_i$ is finished is expressed as $H(K_0, K_1, K_2, \ldots, K_i)$.

When the calculation of the digest value $H(K_0, K_1, K_2, \ldots K_i)$ is completed, the hash calculation circuit 128 notifies the interface 200 that the calculation is completed. The hash calculation circuit 128 then waits until the next data $K_{i+1}$ is input. The above calculation is repeatedly carried out for $K_0$ to $K_{n-1} H(K_0, K_1, K_2, \ldots, K_{n-1})$ can be obtained through the above procedures.

Then, when $K_n$ is input, the padding circuit 121 adds 0 to $K_n$ input from the secret key and message input signal line 119 if necessary based on the data length of the secret key input through the secret key and message calculation processing length input signal line 118, and writes the same in the message data holding circuit 125.

After the write of the data to the message data holding circuit 125 is finished, this is notified to the HMAC control circuit 129. When receiving the notification on the addition of 0 and the finishing of the write of the data to the message data holding circuit 125 from the padding circuit 121, the HMAC control circuit 129 notifies the hash calculation circuit 128 to start the calculation.

The process of H(K) of step S12 is terminated by the above calculation. After the calculation of the last data block $K_n$ of the secret key K is finished, the digest value H(K) (=H($K_0$, $K_1$, $K_2$, ..., $K_n$)) of the secret key K can be obtained.

The block length of the data is Length (B) from $K_0$ to $K_{n-1}$ in $K_0$ to $K_n$. Therefore, the padding circuit 125 does not perform the padding process of 0 on the input $K_i$. In this case, therefore, the data length of the remaining secret key may not be input through the secret key and message calculation processing length input signal line 118 while inputting $K_0$ to $K_{n-1}$.

The block length of the data may be smaller than Length (B) for $K_n$. In this case, the length of $K_n$ needs to be input to the padding circuit 121 through the secret key and message calculation processing length input signal line 118 before inputting $K_n$ to the HMAC calculation circuit 100. This is because the length of $K_n$ is necessary since 0 is added until Length ($K_n$) and Length (B) become equal in the padding circuit 121.

If Length ($K_n$) and Length (B) are equal, 0 does not need to be added in the padding circuit 121, and hence 0 is input to the secret key and message calculation processing length input signal line 118.

The process of H(K) of step S12 is terminated by the above calculation. The hash calculation circuit 128 notifies the HMAC control circuit 129 that the calculation of H(K) is completed. The state of the HMAC control circuit 129 transitions to S14A.

In S14A, the HMAC control circuit 129 writes the calculation result H(K) of the hash calculation circuit 128 to the K holding circuit 124 through the selector 140. In S14B, the calculation result H(K) is output to the padding circuit 121 through the selector 120, so that the padding circuit 121 adds 0 to H(K) to generate the key data K0, and performs the exclusive OR operation of the key data K0 and the constant ipad. The calculation result (K0 xor ipad) is then written to the message data holding circuit 125 through the selector 123. When the write to the K holding circuit 124 and the message data holding circuit 125 is terminated, the HMAC control circuit 129 transitions the state to S15.

<S15 to S16>

The state in which K0 is generated from the data of the secret key, and the K0 xor ipad is written to the message data holding circuit 125 is obtained by the processes of steps S11 to S14A.

The calculation of H((K0 xor ipad)||M) is then carried out using the generated K0 xor ipad. First, the state machine of the HMAC control circuit 129 transitions to state S15, so that the hash calculation is carried out with respect to the K0 xor ipad written to the message data holding circuit 125 using the hash calculation circuit 128 to obtain the digest H(K0 xor ipad).

The extended arithmetic of the message data is sometimes performed with taking the digest depending on the hash algorithm. In this case, the message data extension circuit 122 performs the extended arithmetic with respect to the output of the message data holding circuit 125 and outputs the calculation result to the message data holding circuit 125 through the selector 123. When receiving the calculation result of the message data extended arithmetic circuit 122, the message data holding circuit 125 outputs the held data according to the request from the hash calculation circuit 128.

After the hash calculation circuit 128 finishes the calculation of calculating H(K0 xor ipad), notification is made that the hash calculation of calculating H(K0 xor ipad) is finished from the hash calculation circuit 128 to the HMAC control circuit 129 through the signal line (not shown). The state machine of the HMAC control circuit 129 thereby becomes the state S16 of waiting for the calculation of the message data.

The message data to obtain the HMAC needs to be input to the HMAC calculation circuit 100 through the secret key and message input signal line 119 to perform the calculation of H((K0 xor ipad)||M). The procedures will be described below.

First, the data length (Length (M)) of the message data to calculate is input to the padding circuit 121 using the secret key and message length input signal line 118.

Assuming the message data is M, if Length (B)≥Length (M), the message data is input to the padding circuit 121 through the secret key and message input signal line 119 after the Length (M) is input to the padding circuit 121 through the total message data length input signal line 134 and the secret key and message calculation length input signal line 118. When the message data is input, the padding circuit 121 adds 0 to the message data until reaching the Length (B) and writes the data in which 0 is padded to the message data holding circuit 125.

If Length (B)<Length (M), M is divided into n message data blocks $M_0$, $M_1$, ..., $M_n$ and input through the secret key and message input signal line 119 in order from the beginning. Here, $M_0$, $M_1$, $M_2$, ..., $M_{n-1}$ is divided to the data length same as the Length (B). The data length of $M_n$ is a length of smaller than or equal to the Length (B).

In the calculation of $M_i$ (i=0, ..., n−1), the 0 does not need to be added with respect to the input data using the padding circuit 121, and hence the message length does not need to be input to the secret key and message calculation length input signal line 118. However, if the data size of $M_n$ is smaller than Length (B), the padding circuit 121 needs to perform the 0 padding process with respect to $M_n$, and hence the padding circuit requires the length of the data $M_n$. Therefore, if calculated up to M, the data length from $M_{i+1}$ to $M_n$ is input using the secret key and message calculation length input signal line 118. Similarly, Length (M) needs to be set in the total message data length input signal line 134 before performing the calculation of $M_n$.

When the message data block $M_i$ is input to the message data holding circuit 125, the hash calculation circuit 128 automatically starts the calculation thereby obtaining the result of H(K0 xor ipad)||$M_i$) (i=0, ..., n).

After the input of all the message data blocks $M_i$ (i=0, ..., n) is finished, the calculation of step S16 of FIG. 3 is finished and the intermediate value H((K0 xor ipad)||M) of the HMAC is obtained. The state machine of the HMAC control circuit 129 transitions to the next state S17 when the calculation of H((K0 xor ipad)||M) is finished. The calculation up to step S16 of FIG. 4 is then finished. The input data from the outside does not need to be waited since the calculation is performed using the data already held in the HMAC circuit 17 after step S17 of FIG. 4.

<S17>

In state S17 of the state machine of the HMAC control circuit 129, the HMAC calculation circuit 100 reads the K held in the K holding circuit 124 and inputs to the padding circuit 121 through the selector 120 to perform the calculation of the K0 xor opad. The padding circuit performs 0 padding with respect to the K to generate the key data K0 in which the Length (K0) becomes the Length (B). Furthermore, the calculation of the K0 xor opad is performed at the same time as 0 padding in the padding circuit 121, and the calculation result is written to the message data holding circuit 125. After the write of the data is finished, the state machine of the HMAC control circuit 129 transitions to state S18.

<S18>

In state S18 of the state machine of the HMAC control circuit 129, the calculation result H((K0 xor ipad)||M) calculated in S16 is once written to the K holding circuit 124 from the hash calculation circuit 128 through the selector 140, and the calculation result H((K0 xor ipad)||M) of the hash calculation circuit 128 is evacuated to the K holding circuit 124.

After the evacuation of H((K0 xor ipad)||M) to the K holding circuit 124 is completed, the state machine of the HMAC control circuit 129 transitions to state S19.

<S19>

In S19, the calculation of H(K0 or opad) is performed. In other words, the hash calculation is performed on the K0 xor opad written to the message data holding circuit 125 using the hash calculation circuit 128 to obtain the digest H(K0 xor opad).

After the calculation of H(K0 xor opad) is finished, the state machine of the HMAC control circuit 129 transitions to state S20.

<S20, S21>

In S20, H(K0 xor ipad)||M) evacuated to the K holding circuit 124 in S18 is read to the padding circuit 121 through the selector 120. The padding circuit 121 then performs the 0 padding process with respect to HOW xor ipad)||M) and writes the same to the message data holding circuit 125.

After such write is finished, the state machine of the HMAC control circuit 129 transitions to state 521, and the calculation of H((K0 xor opad)||H((K0 xor ipad)||M)) starts. After such calculation is finished, the HMAC value of the information desired to be obtained is output to the HMAC output signal line 130.

<Problems when Data is Transmitted Via the Network>

When the HMAC calculation circuit 100 proceeds with the calculation in the procedure of S11 to S21 as described above, problems do not arise if the secret key data and the message data are input immediately when required by the HMAC calculation circuit 100. However, problems arise if such data are sent via the network.

For instance, $K_0$ to $K_i$ of the divided secret key $K_0$ to $K_n$ divided from the secret key K are transmitted without any delay via the network 400 when calculation is being performed to generate the digest H(K) of the secret key K in step S12, but the next $K_{i+1}$ may not arrive.

In this case, the calculation of the HMAC is in a state of waiting for the input of $K_{i+1}$, and the calculation of the HMAC remains interrupted. If only one HMAC is used in a system, the calculation may be waiting until the next secret key data $K_{i+1}$ arrives. However, if a plurality of HMACs is required, the processing time of the entire system can be shortened by sequentially processing from the data which calculation can be carried out rather than occupying the HAMC calculation circuit with only the processing of one HMAC.

In the calculation of the HMAC, there are two cases of possibly becoming the data waiting state. The first case is when the secret key K is longer than the block length B of the hash function in step S12 of FIG. 4. The other case is when the message data is longer than the block length B of the hash function in step S18. In other processes, the data necessary for the calculation are held by the HMAC calculation circuit 100 and hence the wait for the data input from the outside does not occur.

The interface 200 detects wait of data input in step 12 and step 18.

<Solution to Problems when Data is Transmitted via the Network>

When wait of data input occurs in the calculation of step S12 and step S18 when obtaining the HMAC, the information that becomes necessary when resuming the calculation is to be evacuated inside the HMAC calculation circuit 100 or held in the storage unit 300 external to the HMAC calculation circuit 100.

Along therewith, the configuration in which the data evacuated inside the HMAC calculation circuit 100 and to the external storage unit 300 can be set and the state of the state machine of the HMAC control circuit 129 for controlling the calculation of the HMAC can be set to a state in which the calculation is interrupted is adopted so that the process can be resumed from step S12 or step S18 when the necessary data are obtained, The calculation of the HMAC thus can be proceeded in order from that in which the data necessary for the calculation are obtained.

In order to satisfy the conditions necessary for resuming as described above, the HMAC calculation circuit 100 includes a resume signal line 27 and the secret key and message data specifying signal line 126.

<Details for Solution>

The signal lines will be described below. First, when the data length (Length (K)) of the secret key is longer than Length (B) in step S12, the procedure of once interrupting and then again resuming the calculation S12 to obtain H(K) to perform the calculation of another HMAC when obtaining the H(K) will be described.

First, the procedure of interrupting step S12 will be described. Assume that up to the divided secret key $K_i$ has arrived of the divided secret key $(K_0, K_1, K_2, \ldots, K_n)$ and the data of a different secret key K2 is obtained before the next data $K_{i+1}$ for obtaining H(K1) arrives when obtaining the digest H(K1) of the secret key K1. In this case, the intermediate result $(K_0, K_1, K_2, \ldots, K_i)$ of H(K1) up to this point is output to the HMAC output signal line 130 of the HMAC calculation circuit 100. The value of the signal to output by the HMAC output signal line 130 is read and recorded in the storage device 300, and the number of bytes of the remaining data necessary for obtaining the digest of the secret key K1 is recorded in the storage device 300.

Since the state machine of the HMAC control circuit 129 needs to be returned to the initial state to obtain the digest of the secret key K2, the HMAC signal output by the HMAC signal line 131 is set to 0 for one or more clock cycles and then the HMAC signal is again set to 1. The state machine of the HMAC control circuit 129 can be transitioned to the initial state by setting the HMAC signal to 0 for one or more clock cycles.

The calculation of the secret key K2 starts after the state machine of the HMAC control circuit 129 is transitioned to the initial state. Since the procedure such as inputting the data length of the secret key K2 in calculating the secret key K2 is similar to the normal calculation, the description thereof will be omitted herein and assumption is made that the calculation of the HMAC is obtained using the secret key K2 and the message data M2.

The resuming procedure for obtaining the digest of the secret key K1 that was previously interrupted after the HMAC of the message data M2 is obtained will be described below.

The resume signal is input as 1, the secret key and message data specifying signal is input as 0, and the remaining data of the secret key K1 is input from the secret key and message input signal line 119 to start up the HMAC calculation circuit 100 in order to have the state of the state machine of the HMAC control circuit 129 in the digest generating state of the secret key. After inputting the resume signal as 1 and the secret key and message specifying signal as 0, the state machine of the HMAC control circuit 129 transitions to state S12 from the initial state. Furthermore, the calculation result of the block one before is used as the initial value of the calculation of the next block in the hash algorithm. Therefore, the intermediate result $H(K_0, K_1, K_2 \ldots, K_i)$ of the secret key K1 recorded in the storage device 300 needs to be returned to the hash calculation circuit 128 in the interruption resuming step to resume from the middle of the calculation of the digest of the secret key K1. The midway progress $H(K_0, K_1, K_2, \ldots, K_i)$ of the digest of the secret key K1 is input to the hash initial value input signal line 132 with the resume signal as 1 and the secret key and message specifying signal as 0. The midway progress $H(K_0, K_1, K_2, \ldots, K_i)$ of the digest of the secret key K1 input from the hash initial value input signal line 132 is written to the digest value storage circuit 143 in the hash calculation circuit 128 through the selector 141 by inputting the resume signal to the selector 141 as 1. Furthermore, the remaining data length of the secret key K1 is input to the secret key and message length input signal line 118 if the data length of the remaining secret key K1 is known.

Thereafter, the remaining divided secret key $(K_{i+1}, K_{i+2}, K_{i+3}, \ldots K_n)$ is input until H(K1) is obtained. If the subsequent process is not interrupted, the message data M1 is input same as in the normal process to obtain the HMAC using the secret key K1.

Next, the procedure of when obtaining the HMAC of the secret key K3 and the message data M3 and the data up to $M_i$ has arrived of the n message data block $(M_0, M_1, M_2, \ldots, M_n)$ of the message data M3 and the data of the HMAC of the secret key K4 and the message data M4 are prepared first before the next data $M_{i+1}$ for obtaining $H((K0 \text{ xor ipad})\|M_0, M_1, M_2, \ldots, M_n)$ arrives and thus the calculation thereof is performed first and then the calculation of $H((K0 \text{ xor ipad})\|M3)$ of the message data M3 is resumed upon obtaining $H((K0 \text{ xor ipad})\|M3)$ of the message data M3 will be described below.

In the calculation of the HMAC using the secret key K3 and the message data M3, the procedure until the calculation of the message data M3 is carried out is the same as the normal process, and thus the description thereof will be omitted. Since the calculation of the secret key K4 and the message data M4 can be executed before while obtaining the digest using the message data M3, the value held in the K holding circuit 124 is read from the K holding circuit 124 using the K output signal line 133 and stored in the secret key data storage circuit 300a of the storage unit 300. Furthermore, the value $H((K0 \text{ xor ipad})\|M_0, M_1, M_2, \ldots, M_i)$ in the middle of the calculation of the HMAC of the message data M3 is output to the HMAC output signal line 130, and hence such value is recorded in the message data storage circuit 300b.

Therefore, the state of the state machine of the HMAC control circuit 129 is returned to the initial state by setting the HMAC signal to 0 after reading the information necessary at the time of resuming. Thereafter, the calculation is carried out in the normal processing procedure using the secret key K4 and the message data M4 to obtain the HMAC.

The method of resuming the calculation using the secret key K3 and the message data M3 after the calculation of the HMAC using the secret key K4 and the message data M4 is terminated will now be described.

In order to have the state of the state machine of the HMAC control circuit 129 as the state of waiting for the calculation of the digest of the message data, the remaining data of the message data M3 is input to the HMAC calculation circuit 100 with the resume signal as 1, the secret key and message specifying signal output by the secret key and message specifying signal line 126 as 1, and the HMAC signal as 1. The state machine of the HMAC control circuit 129 is transitions to the state S16 of waiting for the calculation of the message data by setting the resume signal to 1 and the secret key and message specifying signal to 1.

In the interruption resuming step, the value of $H((K0 \text{ xor ipad})\|M_0, M_1, M_2, \ldots, M_i)$ evacuated to the message data storage circuit 300b is input to the hash initial value input signal line 132 with the resume signal as 1 and the secret key and message specifying signal as 1. The $H((K0 \text{ xor ipad})\|M_0, M_1, M_2, \ldots, M_i)$ input from the hash initial value input signal line 132 by inputting the resume signal as 1 to the selector 141 is written in the digest value storage circuit 143 in the hash calculation circuit 128 via the selector 141.

As described above, the data $H((K0 \text{ xor ipad})\|M_0, M_1, M_2, \ldots, M_i)$ evacuated during the interruption can be provided as the initial value of the hash calculation by using the resume signal and the secret key and message specifying signal so as to resume from where the hash calculation is interrupted.

The data length remaining in the message data M3 is then input to the secret key and message length input signal line 118. In this case, the remaining message data length of the message data M3 merely needs to be input before the last message data block is input to the HMAC calculation circuit 100 if the remaining message length of the message data M3 is unknown. Furthermore, the data length of the message data M3 is input to the total message length input signal line 133.

Moreover, K or H(K) evacuated from the secret key and message input signal line 119 to the storage unit 300 is input with the K write signal output by the K write signal line 135 as 1. When the K write signal input by the K write signal line 135 becomes 1, the selector 140 sends the data input from the secret key and message input signal line 119 to the K holding circuit 124. The remaining message length of the message data M3 is then input to the secret key and message calculation length input signal line 134, and the message length of the message data M3 is input to the total message length input signal line 134.

The preparation of the data necessary for resuming to the HMAC calculation circuit 100 is thereby finished. The HMAC of the secret key K3 and the message data M3 can be obtained by inputting the remaining data $M_{i+1}, M_{i+2}, M_{i+3}, \ldots, M_n$ of the message data M3 to the HMAC calculation circuit 100.

According to the example, the HMAC can be efficiently obtained even when receiving data through the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and sprit of the inventions.

What is claimed is:

1. A computer program product for processing information to obtain an HMAC, comprising:
by using a padding circuit,
generating first key data K0 by adding 0 with respect to secret key data K when a secret key length (Length(K)) of input secret key data K is shorter than a block length (Length(B)) of a hash function,
setting the secret key data K as second key data K0 when the secret key length (Length(K)) is equal to the block length (Length(B)) of the hash function,
generating third key data K0 by adding 0 with respect to a first digest value H(K), which is a digest value of the secret key data K, when the secret key length (Length(K)) is longer than the block length (Length(B)) of the hash function, and
performing an exclusive OR operation with a first constant ipad with respect to one of the first key data K0, the second key data K0, and the third key data K0 to calculate first data (K0 xor ipad);
by using a hash calculation circuit,
obtaining the first digest value H(K), and obtaining a second digest value H((K0 xor ipad)||M), which is a digest value of data ((K0 xor ipad)||M) in which the first data (K0 xor ipad) and the input message data M are connected;
by using a holding circuit,
storing the secret key data K or the first digest value H(K); and
by using a control unit,
managing a processing state for calculating the HMAC, wherein
the hash calculation circuit outputs a midway progress of the first digest value H(K) calculated before the interruption to outside when interrupting a calculation process of the first digest value H(K) in the middle, and is input with the midway progress of the first digest value H(K) to calculate the first digest value H(K) using the midway progress of the first digest value H(K) when resuming the calculation process of the first digest value H(K),
the hash calculation circuit outputs a midway progress of the second digest value H((K0 xor ipad)||M) calculated before the interruption to outside when interrupting a calculation process of the second digest value H((K0 xor ipad)||M) in the middle, and is input with the midway progress of the second digest value H((K0 xor ipad)||M) to calculate the second digest value H((K0 xor ipad)||M) using the midway progress of the second digest value H((K0 xor ipad)||M) when resuming the calculation process of the second digest value H((K0 xor ipad)||M),
the holding circuit outputs the secret key data K or the first digest value H(K) to outside when the hash calculation circuit interrupts the calculation process of the second digest value H((K0 xor ipad)||M) in the middle, and is input with the secret key data K or the first digest value H(K) when the hash calculation circuit resumes the calculation process of the second digest value H((K0 xor ipad)||M),
the hash calculation circuit resumes the calculation process of the first digest value H(K) when a signal indicating resuming instruction of the calculation process of the first digest value H(K) is input to the control unit, and
the hash calculation circuit resumes the calculation process of the second digest value H((K0 xor ipad)||M) when a signal indicating resuming instruction of the calculation process of the second digest value H((K0 xor ipad)||M) is input to the control unit.

2. The computer program product according to claim 1, wherein the midway progress of the first digest value H(K) is input to the hash calculation circuit when a signal instructing the input of the midway progress of the first digest value H(K) is input.

3. The computer program product according to claim 2, wherein the midway progress of the second digest value H((K0 xor ipad)||M) is input to the hash calculation circuit when a signal instructing the input of the midway progress of the second digest value H(K0 xor ipad)||M) is input.

4. The computer program product according to claim 3, wherein:
the hash calculation circuit repeatedly carries out a hash calculation in order of $K_0, K_1, K_2, \ldots K_{n-1}, K_n$ (or data in which 0 is added to $K_n$) with respect to divided secret key $(K_0, K_1, K_2, \ldots, K_n)$ obtained by dividing the secret key data K by n when obtaining the first digest value H(K) to calculate the first digest value $H(K)(=H(K_0, K_1, K_2, \ldots, K_n))$,
the hash calculation circuit outputs $H(K_0, K_1, K_2, \ldots, K_i)$ as the midway progress of the calculation process of the first digest value $H(K_0, K_1, K_2, \ldots, K_n)$ when interrupting the calculation process of the first digest value $H(K_0, K_1, K_2, \ldots, K_n)$ in the middle and when carrying out the hash calculation for the divided secret key $K_0, K_1, K_2, \ldots K_i$ in the calculation process, and
when resuming the calculation process of the first digest value H(K), the midway progress $H(K_0, K_1, K_2, \ldots, K_i)$ is input to the hash calculation circuit, and the divided secret keys $K_{i+1}, \ldots, K_n$ are input to calculate the first digest value $H(K_0, K_1, K_2, \ldots, K_n)$.

5. The computer program product according to claim 4, wherein:
the hash calculation circuit repeatedly carries out a hash calculation in order of $M_0, M_1, M_2, \ldots, M_n$ (or data in which 0 is added to $M_n$) with respect to divided message data blocks $(M_0, M_1, M_2, \ldots, M_n)$ obtained by dividing the message data by n when obtaining the second digest value H((K0 xor ipad)||M) to calculate the second digest value H((K0 xor ipad)||M)(=H((K0 xor ipad)||$M_0, M_1, M_2, \ldots, M_n$)),
the hash calculation circuit outputs H((K0 xor ipad)||$M_0, M_1, M_2, \ldots, M_i$) as the midway progress of the calculation process of the second digest value when interrupting the calculation process of the second digest value H((K0 xor ipad)||M) in the middle and when carrying out the hash calculation for the message data blocks ($M_0, M_1, M_2, \ldots, M_i$) in the calculation process, and
when resuming the calculation process of the second digest value, the midway progress H((K0 xor ipad)||$M_0, M_1, M_2, \ldots, M_i$) is input, and the message data blocks $M_{i+1}, \ldots, M_n$ are input to calculate the second digest value H((K0 xor ipad)||$M_0, M_1, M_2, \ldots, M_n$).

6. A method for processing information to obtain an HMAC, comprising:
by using a padding circuit,
generating first key data K0 by adding 0 with respect to secret key data K when a secret key length (Length(K)) of input secret key data K is shorter than a block length (Length(B)) of a hash function, setting the secret key data K as second key data K0 when the secret key length (Length(K)) is equal to the block length (Length(B)) of the hash function, generating third key data K0 by adding 0 with respect to a first digest value H(K), which is a digest value of the secret key data K, when the secret key length (Length(K)) is longer than the block length (Length(B)) of the hash function, and performing an exclusive OR operation with a first constant ipad with respect to one of the first key data K0, the second key data K0, and the third key data K0 to calculate first data (K0 xor ipad);

by using a hash calculation circuit, obtaining the first digest value H(K), and obtaining a second digest value H(K0 xor ipad)||M), which is a digest value of data ((K0 xor ipad)||M) in which the first data (K0 xor ipad) and the input message data M are connected;

by using a holding circuit, storing the secret key data K or the first digest value H(K); and by using a control unit, managing a processing state for calculating the HMAC, wherein the hash calculation circuit outputs a midway progress of the first digest value H(K) calculated before the interruption to outside when interrupting a calculation process of the first digest value H(K) in the middle, and is input with the midway progress of the first digest value H(K) to calculate the first digest value H(K) using the midway progress of the first digest value H(K) when resuming the calculation process of the first digest value H(K), the hash calculation circuit outputs a midway progress of the second digest value H((K0 xor ipad)||M) calculated before the interruption to outside when interrupting a calculation process of the second digest value H((K0 xor ipad)||M) in the middle, and is input with the midway progress of the second digest value H((K0 xor ipad)||M) to calculate the second digest value H((K0 xor ipad)||M) using the midway progress of the second digest value H((K0 xor ipad)||M) when resuming the calculation process of the second digest value H((K0 xor ipad)||M), the holding circuit outputs the secret key data K or the first digest value H(K) to outside when the hash calculation circuit interrupts the calculation process of the second digest value H((K0 xor ipad)||M) in the middle, and is input with the secret key data K or the first digest value H(K) when the hash calculation circuit resumes the calculation process of the second digest value H((K0 xor ipad)||M), the hash calculation circuit resumes the calculation process of the first digest value H(K) when a signal indicating resuming instruction of the calculation process of the first digest value H(K) is input to the control unit, and the hash calculation circuit resumes the calculation process of the second digest value H((K0 xor ipad)||M) when a signal indicating resuming instruction of the calculation process of the second digest value H((K0 xor ipad)||M) is input to the control unit.

7. The method according to claim 6, wherein the midway progress of the first digest value H(K) is input to the hash calculation circuit when a signal instructing the input of the midway progress of the first digest value H(K) is input.

8. The method according to claim 7, wherein the midway progress of the second digest value H((K0 xor ipad)||M) is input to the hash calculation circuit when a signal instructing the input of the midway progress of the second digest value H((K0 xor ipad)||M) is input.

9. The method according to claim 8, wherein:

the hash calculation circuit repeatedly carries out a hash calculation in order of K0, K1, K2, ... Kn−1, Kn (or data in which 0 is added to Kn) with respect to divided secret key (K0, K1, K2, ..., Kn) obtained by dividing the secret key data K by n when obtaining the first digest value H(K) to calculate the first digest value H(K)(=H(K0, K1, K2, ..., Kn)), the hash calculation circuit outputs H(K0, K1, K2, ..., Ki) as the midway progress of the calculation process of the first digest value H(K0, K1, K2, ..., Kn) when interrupting the calculation process of the first digest value H(K0, K1, K2, ..., Kn) in the middle and when carrying out the hash calculation for the divided secret key K0, K1, K2, ... Ki in the calculation process, and when resuming the calculation process of the first digest value H(K), the midway progress H(K0, K1, K2, ..., Ki) is input to the hash calculation circuit, and the divided secret keys Ki+1, ..., Kn are input to calculate the first digest value H(K0, K1, K2, ..., Kn).

10. The method according to claim 9, wherein:

the hash calculation circuit repeatedly carries out a hash calculation in order of M0, M1, M2, ..., Mn (or data in which 0 is added to Mn) with respect to divided message data blocks (M0, M1, M2, ..., Mn) obtained by dividing the message data by n when obtaining the second digest value H((K0 xor ipad)||M) to calculate the second digest value H((K0 xor ipad)||M)(=H((K0 xor ipad)||M0, M1, M2, ..., Mn)), the hash calculation circuit outputs H((K0 xor ipad)||M0, M1, M2, ..., Mi) as the midway progress of the calculation process of the second digest value when interrupting the calculation process of the second digest value H((K0 xor ipad)||M) in the middle and when carrying out the hash calculation for the message data blocks (M0, M1, M2, ..., Mi) in the calculation process, and when resuming the calculation process of the second digest value, the midway progress H((K0 xor ipad)||M0, M1, M2, ..., Mi) is input, and the message data blocks Mi+1, ..., Mn are input to calculate the second digest value H((K0 xor ipad)||M0, M1, M2, ..., Mn).

* * * * *